(12) United States Patent
Okumura et al.

(10) Patent No.: US 7,053,573 B2
(45) Date of Patent: May 30, 2006

(54) MOTOR DRIVE APPARATUS, INTEGRATED CIRCUIT, AND MOTOR DRIVE METHOD

(75) Inventors: Takekiyo Okumura, Gunma-ken (JP); Hirotaka Morita, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/046,412

(22) Filed: Jan. 28, 2005

(65) Prior Publication Data

US 2005/0168181 A1 Aug. 4, 2005

(30) Foreign Application Priority Data

Jan. 29, 2004 (JP) .............................. 2004-022078

(51) Int. Cl.
*H02P 7/10* (2006.01)

(52) U.S. Cl. ...................... 318/452; 318/484; 318/487; 318/439

(58) Field of Classification Search ................ 318/452, 318/484, 487, 439
See application file for complete search history.

(56) References Cited

U.S. PATENT DOCUMENTS

| | | | | |
|---|---|---|---|---|
| 4,047,081 A | * | 9/1977 | Liska ......................... | 318/138 |
| 4,167,693 A | * | 9/1979 | Liska et al. ................. | 318/138 |
| 4,400,654 A | * | 8/1983 | Elliott ........................ | 318/254 |
| 4,468,595 A | * | 8/1984 | Yaebashi .................... | 318/254 |
| 4,492,903 A | * | 1/1985 | Knight et al. ............... | 318/254 |
| 4,535,275 A | * | 8/1985 | Muller ....................... | 318/254 |
| 4,581,544 A | * | 4/1986 | Feldman .................... | 327/176 |
| 4,584,505 A | * | 4/1986 | Chung et al. ............... | 318/254 |
| 4,720,663 A | * | 1/1988 | Welch et al. ............... | 318/254 |
| 4,752,724 A | * | 6/1988 | Radziwill et al. ........... | 318/254 |
| 4,782,272 A | * | 11/1988 | Buckley et al. ............. | 318/254 |
| 4,897,583 A | * | 1/1990 | Rees .......................... | 318/254 |
| 4,988,939 A | * | 1/1991 | Reichard et al. ............ | 318/800 |
| 5,041,774 A | * | 8/1991 | Komatsu .................... | 318/727 |
| 5,053,688 A | * | 10/1991 | Rees .......................... | 318/599 |
| 5,057,753 A | * | 10/1991 | Leuthold et al. ............ | 318/254 |
| 5,068,582 A | * | 11/1991 | Scott .......................... | 318/254 |
| 5,157,311 A | * | 10/1992 | Hara et al. .................. | 318/254 |
| 5,160,873 A | * | 11/1992 | Tukiyama et al. .......... | 318/254 |
| 5,285,135 A | * | 2/1994 | Carobolante et al. ....... | 318/254 |
| 5,319,289 A | * | 6/1994 | Austin et al. ............... | 318/254 |
| 5,319,291 A | * | 6/1994 | Ramirez ..................... | 318/254 |
| 5,397,967 A | * | 3/1995 | Carobolante et al. ....... | 318/254 |
| 5,428,276 A | * | 6/1995 | Carobolante et al. ....... | 318/254 |
| 5,448,141 A | * | 9/1995 | Kelley et al. ............... | 318/254 |

(Continued)

FOREIGN PATENT DOCUMENTS

JP 2002-325479 11/2002

*Primary Examiner*—David Martin
*Assistant Examiner*—Robert W. Horn
(74) *Attorney, Agent, or Firm*—SoCal IP Law Group LLP; Steven C. Sereboff; Joel G. Landau

(57) ABSTRACT

A motor drive apparatus which drives a motor by controlling conduction/non-conduction of a drive transistor for causing a current to flow through a drive coil of the motor based on a pulse signal indicating a relative position between the rotor and stator of the motor, generated by a position detector, and on a rotation speed setting voltage for setting the rotation speed of the motor. The apparatus comprises a control circuit that generates a pulse-delayed signal by delaying the pulse signal by delay time according to the voltage level of the rotation speed setting voltage.

20 Claims, 7 Drawing Sheets

U.S. PATENT DOCUMENTS

| | | | |
|---|---|---|---|
| 5,532,562 A * | 7/1996 | Yasuda | 318/439 |
| 5,640,073 A * | 6/1997 | Ikeda et al. | 318/439 |
| 5,682,088 A * | 10/1997 | Sonnek | 318/254 |
| 5,731,670 A * | 3/1998 | Galbiati et al. | 318/254 |
| 5,739,650 A * | 4/1998 | Kimura et al. | 318/254 |
| 5,767,643 A * | 6/1998 | Pham et al. | 318/439 |
| 5,780,983 A * | 7/1998 | Shinkawa et al. | 318/254 |
| 5,845,045 A * | 12/1998 | Jeske et al. | 388/804 |
| 5,859,510 A * | 1/1999 | Dolan et al. | 318/254 |
| 5,907,226 A * | 5/1999 | Ohsawa et al. | 318/439 |
| 5,929,577 A * | 7/1999 | Neidorff et al. | 318/254 |
| 6,046,561 A * | 4/2000 | Zup et al. | 318/439 |
| 6,181,091 B1 * | 1/2001 | Heeren et al. | 318/138 |
| 6,307,338 B1 * | 10/2001 | Kuner et al. | 318/254 |
| 6,335,598 B1 * | 1/2002 | Lin et al. | 318/254 |
| 6,710,572 B1 * | 3/2004 | Okubo | 318/727 |
| 6,924,611 B1 * | 8/2005 | Tzeng et al. | 318/254 |
| 2002/0079861 A1 * | 6/2002 | Schubert | 318/727 |
| 2002/0141874 A1 * | 10/2002 | Schoenmeyr | 417/32 |
| 2003/0002899 A1 * | 1/2003 | Furukawa et al. | 400/120.01 |

* cited by examiner

MOTOR DRIVE APPARATUS, INTEGRATED CIRCUIT, AND MOTOR DRIVE METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

RELATED APPLICATION INFORMATION

This patent claims priority upon Japanese Patent Application No. 2004-022078 filed on Jan. 29, 2004, which is herein incorporated by reference.

BACKGROUND OF THE INVENTION

1. Field of the Invention

The present invention relates to a motor drive apparatus, an integrated circuit, and a motor drive method.

2. Description of the Related Art

A brushless motor is mainly used in air conditioner motors (a blower fan motor and the like) for automobiles or electric appliances because of great demand for lower noise. Brushless motors for these applications comprise an inexpensive hall device for detecting a relative position between a rotor and a stator.

A conventional motor drive apparatus, when driving a brushless motor apparatus having a hall device, controls conduction/non-conduction of drive transistors for switching current directions through each drive coil of the brushless motor based on a position detection signal detected by the hall device. By controlling the conduction timings of the drive transistors so as to be appropriate timings, the brushless motor is driven in an appropriate rotational direction.

Note that even if a brushless motor is used, when the rotation speed varies such as when the rotation speed is changed from low to high, a buzz occurs in rotation sound thereby causing noise (so-called buzzing). It is known that instead of rendering a predetermined drive transistor conductive at the input timing of the position detection signal detected by the hall device, by rendering the predetermined drive transistor conductive at a timing delayed from the input timing of the position detection signal detected by the hall device, noise associated with the variation in the rotation speed is reduced.

A conventional motor drive apparatus uses the slow waveform of the charge/discharge voltage of a capacitor in order to set time from the input timing of the position detection signal to the time the predetermined drive transistor is rendered conductive (hereinafter, referred to as "timing delay time TC"). The timing delay time TC is expressed by the approximate equation "$TC = C \times V \div I$" where C, I, and V are the capacitance, charge/discharge current, and voltage of the capacitor respectively. Hence, conventionally the timing delay time TC is set by switching a plurality of (e.g., three) predetermined charge/discharge currents I according to the rotation speed setting voltage ratio VIND (%) for setting the rotation speed at a value specified by an external device such as a microcomputer.

For example, in FIG. 8, the timing delay time TC is switched between three levels: 0.7 ms for the rotation speed setting voltage ratio VIND (%) of 0 to 46%, 0.4 ms for the rotation speed setting voltage ratio VIND (%) of 47 to 66%, 0.1 ms for the rotation speed setting voltage ratio VIND (%) of 67 to 100%. See for example Japanese Patent Application Laid-open Publication No. 2002-325479.

If charge/discharge currents I are switched stepwise according to the rotation speed setting voltage ratio VIND (%), thus setting the timing delay time TC at a plurality of levels, the timing delay time TC changes sharply at the boundaries between the levels. Thus, the problem occurs that, when the rotation speed setting voltage ratio VIND (%) specified by the external device is close to one of the boundaries between the levels, or when the rotation speed setting voltage ratio VIND (%) passes through the boundaries between the levels while the rotation speed changes continuously according to rotation speed control by the external device, the setting of the timing delay time TC does not expectedly produce the effect of reducing noise.

SUMMARY OF THE INVENTION

The present invention is made in view of the above problem, and an object thereof is to provide a motor drive apparatus, an integrated circuit, and a motor drive method.

One aspect of the present invention to solve the above and other problems is a motor drive apparatus which drives a motor by controlling conduction/non-conduction of a drive transistor for causing a current to flow through a drive coil of the motor based on a pulse signal indicating a relative position between the rotor and stator of the motor, generated by a position detector, and on a rotation speed setting voltage for setting the rotation speed of the motor, the apparatus comprising a control circuit that generates a pulse-delayed signal by delaying the pulse signal by delay time according to the voltage level of the rotation speed setting voltage.

According to the present invention, there are provided a motor drive apparatus, an integrated circuit, and a motor drive method which reduce noise when the motor rotates.

Features and objects of the present invention other than the above will become clear by reading the description of the present specification with reference to the accompanying drawings.

DESCRIPTION OF THE DRAWINGS

For more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<Entire Configuration>

The entire configuration of a motor drive apparatus 500 according to the present invention will be described with reference to FIGS. 1, 2, 3, and 4. The motor drive apparatus 500 is embodied as an integrated circuit. In the present embodiment, a motor refers to a three-phase brushless motor having hall devices 10, 11, 12 for detecting a relative position between the rotor and the stator. Needless to say, the motor may be a single-phase brushless motor or a two-phase brushless motor, and further, the devices for detecting the relative position between the rotor and the stator are not limited to hall devices, but may be other magneto-electric conversion devices (magnetic resistance devices, etc.).

Figure 1:
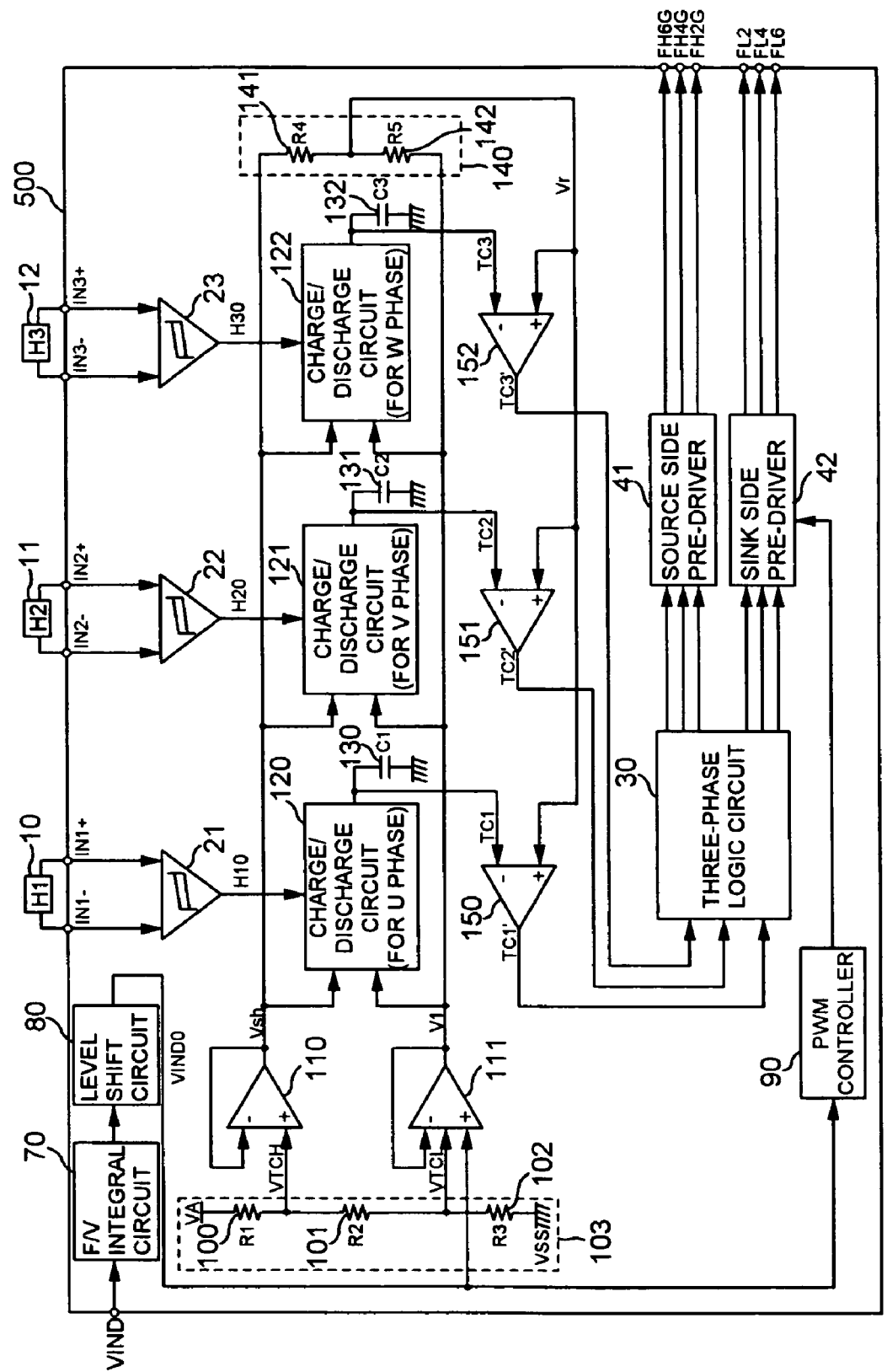
FIG. 1 is a view for explaining the entire configuration of a motor drive apparatus according to an embodiment of the present invention.
Figure 2:
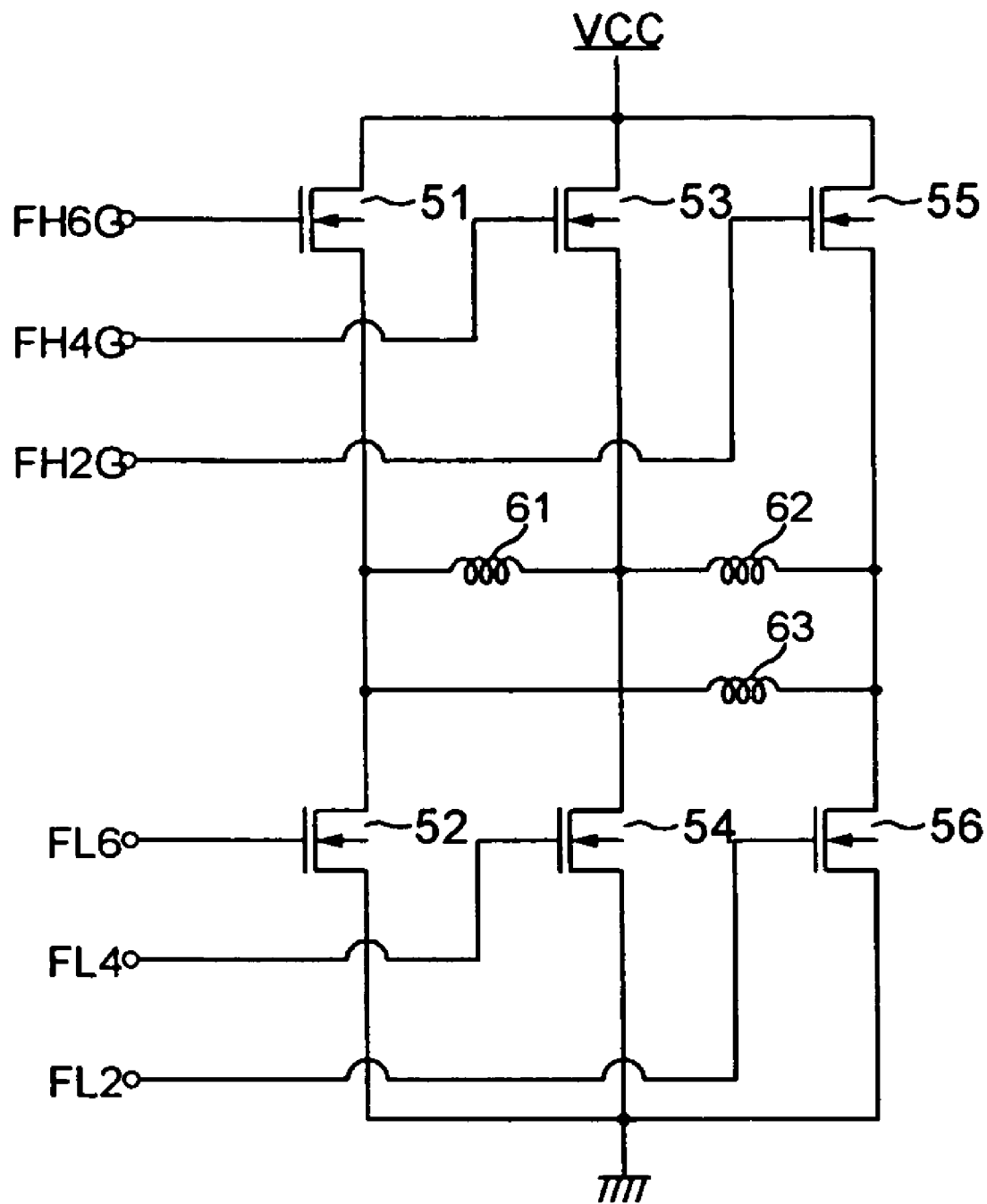
FIG. 2 is a view for explaining a configuration having drive coils and components associated therewith externally connected to the motor drive apparatus according to the embodiment of the present invention.

In an embodiment of the present invention, drive coils 61, 62, 63 fixed to the stator of the motor and NMOSFETs 51, 52, 53, 54, 55, 56 for switching the directions of currents flowing through drive coils 61, 62, 63 at appropriate timings (or causing currents to flow), as shown in FIG. 2, are connected externally to the motor drive apparatus 500.

Note that NMOSFETs 51, 53, 55 are drive transistors on the source side (outlet side), and NMOSFETs 52, 54, 56 are drive transistors on the sink side (inlet side). Drain-source paths of NMOSFETs 51, 52, drain-source paths of NMOSFETs 53, 54, and drain-source paths of NMOSFETs 55, 56 are each connected in series between a power supply VCC and ground. Furthermore, drive coil 61 is connected between the drain-source connection of NMOSFETs 51, 52 and the drain-source connection of NMOSFETs 53, 54; drive coil 62 is connected between the drain-source connection of NMOSFETs 53, 54 and the drain-source connection of NMOSFETs 55, 56; and drive coil 63 is connected between the drain-source connection of NMOSFETs 51, 52 and the drain-source connection of NMOSFETs 55, 56.

The motor drive apparatus 500 switches the directions of currents flowing through drive coils 61, 62, 63 by supplying drive signals to the gate electrodes of NMOSFETs 51, 52, 53, 54, 55, 56. As a result, the motor is driven in an appropriate rotational direction. Note that NMOSFETs 51, 52, 53, 54, 55, 56 and a power source circuit supplying power supply VCC may be incorporated in the motor drive apparatus 500.

In the motor drive apparatus 500, sine-wave-shaped position detection signals detected by hall devices 10, 11, 12 are inputted via input terminals IN1±, IN2±, IN3±. These inputted sine-wave-shaped position detection signals are amplified and binarized by comparators with hysteresis 21, 22, 23 to be converted to pulse-like position detection signals (pulse signals). That is, hall devices 10, 11, 12 and comparators 21, 22, 23, which form a position detector, generate pulse-like position detection signals indicating the relative position between the rotor and the stator. The outputs H10, H20, H30 of comparators 21, 22, 23 are inputted via charge/discharge circuits 120, 121, 122 described later and comparators 150, 151, 152 described later to a three-phase logic circuit 30.

Figure 3:
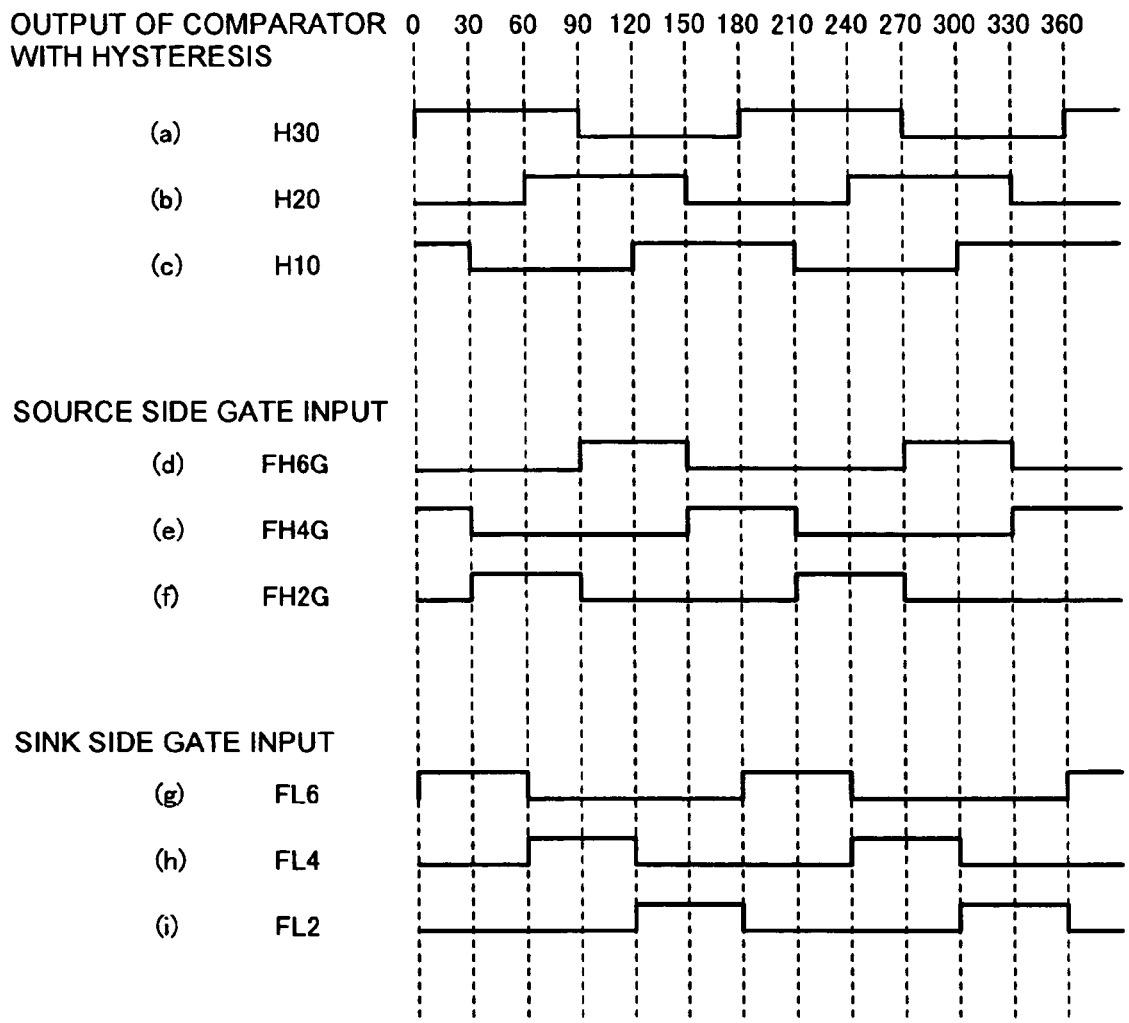
FIG. 3 is a view for explaining a usual relationship between the outputs of comparators and gate inputs of drive transistors.

The three-phase logic circuit 30 controls conduction/non-conduction of NMOSFETs 51, 52, 53, 54, 55, 56 shown in FIG. 2 based on the outputs H10, H20, H30 of comparators 21, 22, 23. FIG. 3 is a view for explaining an example of a usual relationship between the outputs of comparators 21, 22, 23 and inputs to the gate electrodes of NMOSFETs 51, 52, 53, 54, 55, 56 in the case where the timing delay time TC described later is not set. In FIG. 3(*a*), the output H30 of comparator 23 changes from a High level to a Low level at an electric angle of 90°. And, the three-phase logic circuit 30 controls so as to render NMOSFETs 51, 54 conductive at the timing when the output level of comparator 23 switches (at the electric angle of 90°) in the case where the timing delay time TC described later is not set. As a result, in an electric angle section of 90° to 120°, a current flows through along the drain-source path of NMOSFET 51, drive coil 61, and the drain-source path of NMOSFET 54.

The three-phase logic circuit 30 generates source side drive signals to control conduction/non-conduction of NMOSFETs 51, 53, 55 and supplies them to a source side pre-driver 41. Likewise, the three-phase logic circuit 30 generates sink side drive signals to control conduction/non-conduction of NMOSFETs 52, 54, 56 and supplies them to a sink side pre-driver 42.

The source side pre-driver 41 amplifies the source side drive signals supplied from the three-phase logic circuit 30 to an enough voltage level to drive the gate electrodes of NMOSFETs 51, 53, 55, and supplies the amplified signals via predetermined output terminals FH6G, FH4G, FH2G to the gate electrodes of NMOSFETs 51, 53, 55. See FIGS. 3(*d*), 3(*e*), 3(*f*).

The sink side pre-driver 42 amplifies the sink side drive signals supplied from the three-phase logic circuit 30 to an enough voltage level to drive the gate electrodes of NMOSFETs 52, 54, 56, and supplies the amplified signals via predetermined output terminals FL6, FL4, FL2 to the gate electrodes of NMOSFETs 52, 54, 56. See FIGS. 3(*g*), 3(*h*), 3(*i*).

The three-phase logic circuit 30 controls such that each of the pairs of NMOSFETs 51, 52, of NMOSFETs 53, 54, and of NMOSFETs 55, 56 do not become conductive at the same time. In, e.g., FIG. 3(*d*), while NMOSFET 51 is rendered conductive in an electric angle section of 90° to 150°, first in an electric angle section of 90° to 120°, NMOSFET 54 is rendered conductive and thereby a current flows through along the drain-source path of NMOSFET 51, drive coil 61, and the drain-source path of NMOSFET 54. Then, in the subsequent electric angle section of 120° to 150°, NMOSFET 56 is rendered conductive and thereby a current flows through along the drain-source path of NMOSFET 51, drive coil 63, and the drain-source path of NMOSFET 56. Thus, in the electric angle section of 90° to 150°, NMOSFETs 51, 52 do not become conductive at the same time.

An F/V integral circuit 70 converts the rotation speed setting voltage ratio VIND (%) for setting the motor rotation speed (frequency), inputted by an external device such as a microcomputer via an input terminal VIND to a voltage proportional to the rotation speed setting voltage ratio VIND (%). Then, a level shift circuit 80 shifts the converted voltage in level to produce a rotation speed setting voltage VIND0 (V) applicable inside the motor drive apparatus 500.

A PWM controller 90 divides the sink side drive signals output from the sink side pre-driver 42 according to a chopper scheme to convert each signal to a pulse sequence of which the duty ratio of the pulse width is varied depending on the voltage level of the rotation speed setting voltage VIND0 (V). By changing the duty ratio of the pulse width of the sink side drive signals in this way, average currents flowing through respective drive coils 61, 62, 63 changes thereby setting the rotation speed according to the voltage level of the rotation speed setting voltage VIND0 (V).

Figure 4:
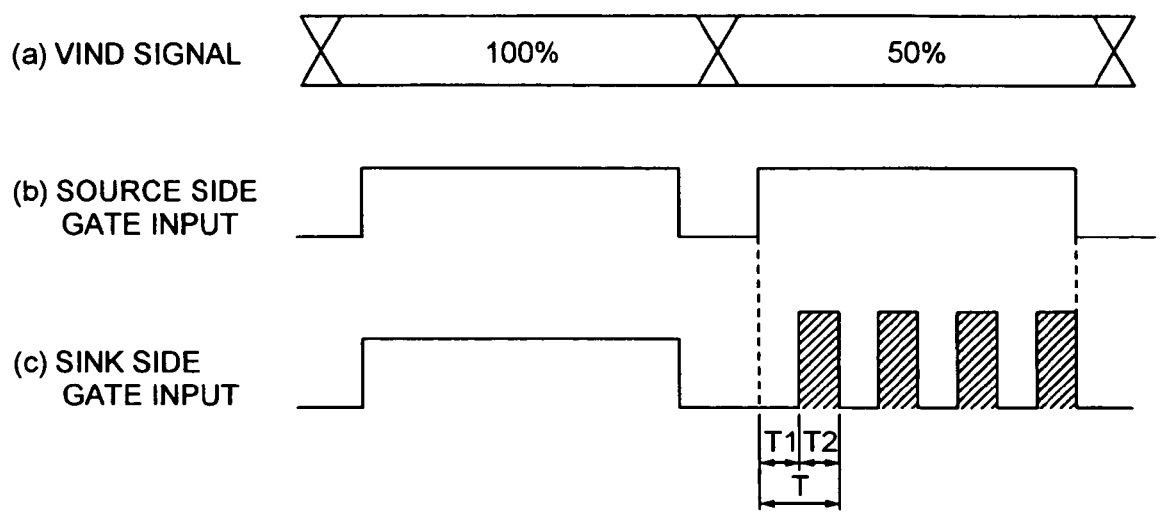
FIG. 4 is a view for explaining a usual relationship between a rotation speed setting voltage ratio VIND (%) and inputs to the gate electrodes of the drive transistors.

FIG. 4 is a conceptual diagram for explaining PWM control based on the rotation speed setting voltage ratio VIND (%). In FIG. 4(a), when the rotation speed setting voltage ratio VIND (%) switches from 100% indicating the full rotation speed to 50%, the source side drive signals supplied to the gate electrodes of NMOSFETs 51, 53, 55 on the source side are maintained at 100%. See FIG. 4(b). Meanwhile, the sink side drive signals supplied to the gate electrodes of NMOSFETs 52, 54, 56 on the sink side switches to 50% in duty ratio (=T2/T).

Note that the PWM controller 90 may perform PWM control, based on the rotation speed setting voltage ratio VIND (%) as above, on the outputs of the source side pre-driver 41 or both the outputs of the source side pre-driver 41 and the sink side pre-driver 42.

A resistor 100 of resistance R1, a resistor 101 of resistance R2, and a resistor 102 of resistance R3 connected in series form a series resistor 103, which is connected between a power supply voltage VA (first voltage) and a ground voltage VSS (second voltage). That is, power supply voltage VA is supplied to one end of the series resistor 103 and ground voltage VSS lower than power supply voltage VA is supplied to the other end of the series resistor 103.

The series resistor 103, an operational amplifier 110, and a limiter circuit 111 are for generating two different charge/discharge reference voltages that define the range of charge/discharge voltages of capacitors 130, 131, 132. Note that, of the two different charge/discharge reference voltages, the higher voltage level is called an upper limiter voltage and the lower voltage level is called a lower limiter voltage.

A voltage VTCH on the basis of a voltage split ratio of (R2+R3)/(R1+R2+R3) is produced at the connection of resistors 100, 101 of the series resistor 103 (a first connection), and is supplied to the plus input terminal of operational amplifier 110 having its output fed back to the minus input terminal.

Operational amplifier 110 functions as a buffer, and is for supplying the stable input voltage VTCH to circuits of the subsequent stage. Note that operational amplifier 110 outputs a voltage Vsh that is the highest voltage level (hereinafter, referred to as an "upper limiter voltage") of the charge/discharge voltage of capacitor 130, 131, 132.

A voltage VTCL on the basis of a voltage split ratio of R3/(R1+R2+R3) is produced at the connection of resistors 101, 102 of the series resistor 103 (a second connection, which is on the VSS side of the connection of resistors 100, 101), and is supplied to the limiter circuit 111.

The limiter circuit 111 is supplied with voltage VTCL produced at the connection of resistors 101, 102 and the rotation speed setting voltage VIND0 (V), and outputs a variable voltage V1 obtained by limiting the rotation speed setting voltage VIND0 (V) so as to become voltage VTCL or lower. This variable voltage V1 is the lowest voltage level of the charge/discharge voltage of capacitor 130, 131, 132.

Hence, the range of the charge/discharge voltages of capacitors 130, 131, 132 is between the fixed upper limiter voltage Vsh and the variable voltage V1, thus varying.

Charge/discharge circuits 120, 121, 122, capacitors 130, 131, 132, a series resistor 140, and comparators 150, 151, 152 generate timing delayed signals TC1', TC2', TC3' obtained by delaying the outputs H10, H20, H30 of comparators 21, 22, 23 by the timing delay time TC proportional to a voltage difference (Vsh−V1) between the upper limiter voltage Vsh output from operational amplifier 110 and the variable voltage V1 output from limiter circuit 111. Note that the timing delay time TC is defined by the approximate equation "TC=C×V÷I", where C, I, and V are the capacitance and charge/discharge current of capacitor 130, 131, or 132, and the voltage difference (Vsh−V1), the range of the charge/discharge voltage, respectively.

In charge/discharge circuit 120, 121, 122, the charge/discharge of capacitor 130, 131, 132 is switched at the edge timings of the output H10, H20, H30 of comparator 21, 22, 23 while, using the slowed waveform of the charge/discharge voltage of capacitor 130, 131, 132, capacitor 130, 131, 132 is charged and discharged within the range between the upper limiter voltage Vsh and the variable voltage V1.

A resistor 141 of resistance R4, a resistor 142 of resistance R5 connected in series form a series resistor 140, which is connected between the upper limiter voltage Vsh and the variable voltage V1. That is, the upper limiter voltage Vsh (a predetermined voltage) is supplied to one end of the series resistor 140 and the variable voltage V1 (a rotation speed setting voltage) is supplied to the other end thereof. A comparison reference voltage Vr on the basis of a voltage split ratio of R5/(R4+R5) is produced at the connection of resistors 141, 142 of the series resistor 140, and is supplied to the plus input terminals of comparators 150, 151, 152.

Comparators 150, 151, 152 compare charge/discharge voltages TC1, TC2, TC3 produced in charge/discharge circuits 120, 121, 122 with the comparison reference voltage Vr, and based on the comparison results, generate the timing delayed signals TC1', TC2', TC3' obtained by delaying the outputs H10, H20, H30 of comparators 21, 22, 23.

<Setting of the Timing Delay Time TC>

Figure 5:
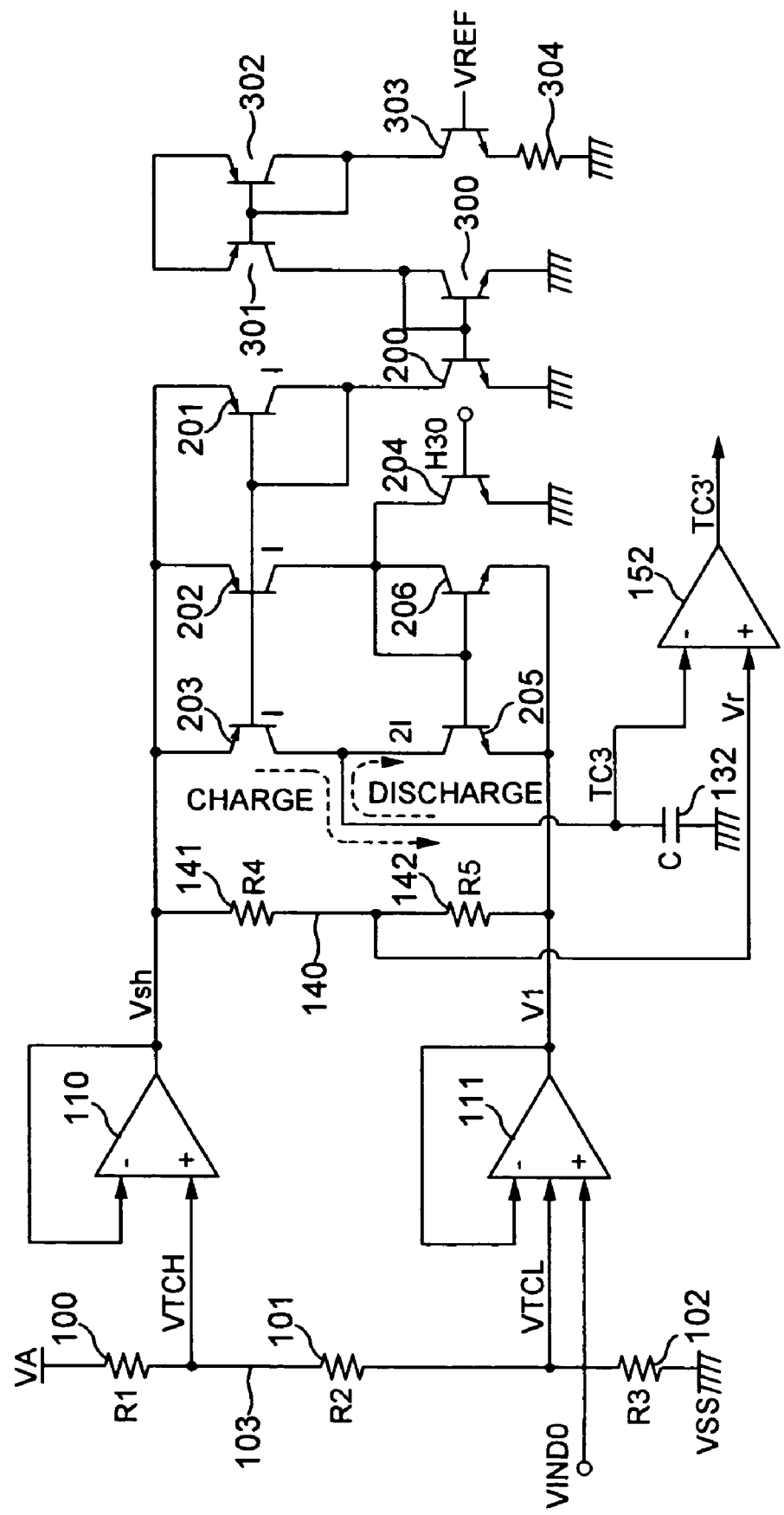
FIG. 5 is a view for explaining a configuration having charge/discharge circuits and components associated therewith according to the embodiment of the present invention.
Figure 6:
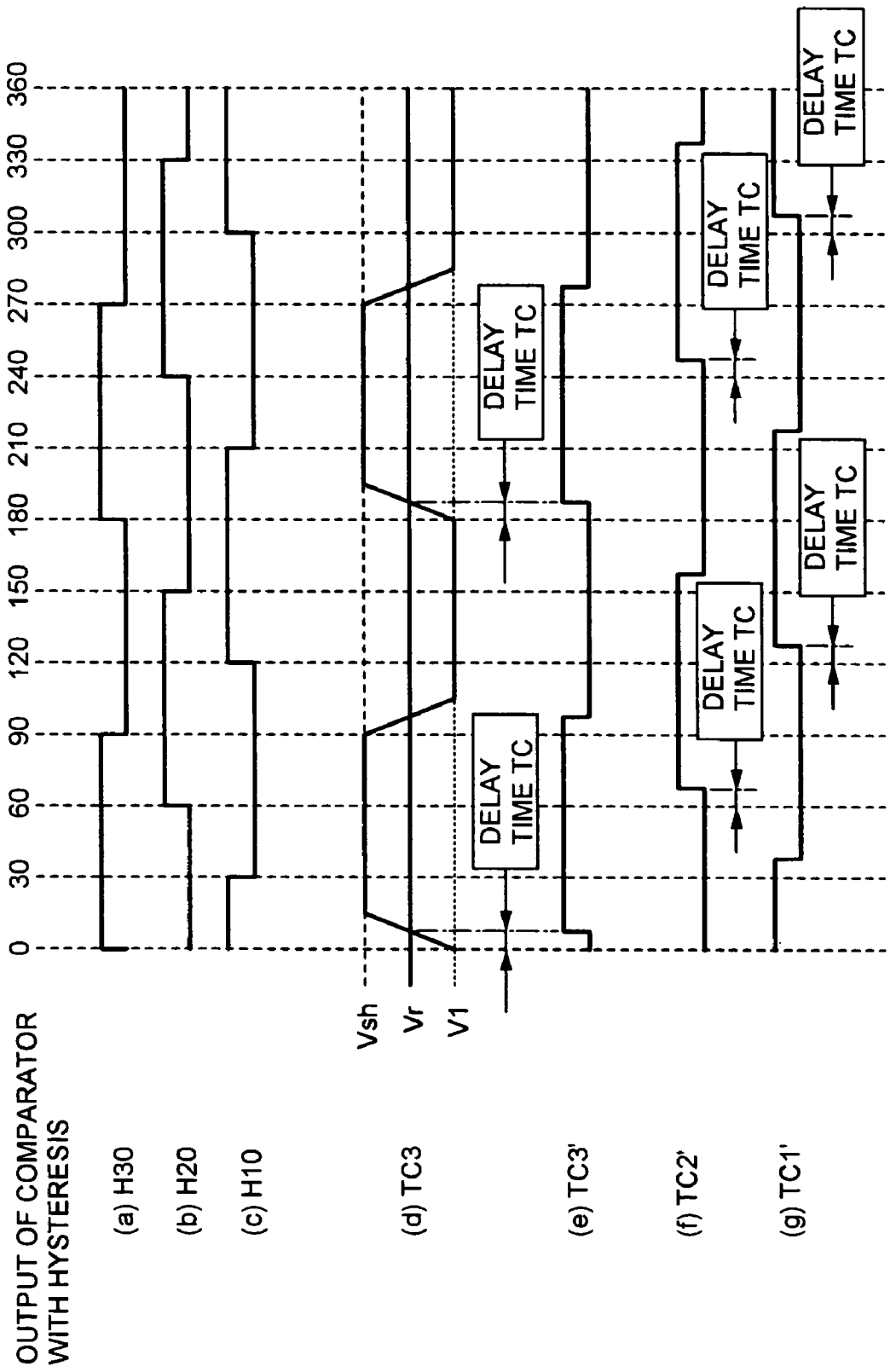
FIG. 6 is a view for explaining a relationship between the outputs of comparators and gate inputs of the drive transistors according to the embodiment of the present invention.

The setting of the timing delay time TC according to the present invention will be described in detail with reference to FIGS. 5, 6. FIG. 5 illustrates the configuration of charge/discharge circuit 122 for one phase (e.g., a W phase) and components associated therewith, which is the same as that of charge/discharge circuits 120, 121 for the other two phases (e.g., a U phase and a V phase) and components associated therewith.

Series resistor 103 comprises resistors 100, 101, 102 connected in series. Power supply voltage VA is supplied to one end of series resistor 103 and ground voltage VSS is supplied to the other end of series resistor 103. And the voltage VTCH equal to (R2+R3)×(VA−VSS)÷(R1+R2+R3) is produced at the connection of resistors 100, 101 of series resistor 103 and is supplied to the plus input terminal of operational amplifier 110, which outputs the upper limiter voltage Vsh.

Furthermore, the voltage VTCL equal to R3×(VA−VSS)÷(R1+R2+R3) is produced at the connection of resistors 101, 102 of series resistor 103. Limiter circuit 111 has this voltage VTCL and the rotation speed setting voltage VIND0 (V) inputted thereto and outputs as the variable voltage V1 the rotation speed setting voltage VIND0 (V) limited to become voltage VTCL or lower.

The series resistor 140 comprises resistors 141, 142 connected in series. The upper limiter voltage Vsh is supplied to one end of series resistor 140 and the variable voltage V1 is supplied to the other end of series resistor 140. The comparison reference voltage Vr equal to R5×(Vsh−

V1)÷(R4+R5) is produced at the connection of resistors 141, 142 of series resistor 140, and is supplied to the plus input terminals of comparator 152.

PNP bipolar transistors 301, 302, NPN bipolar transistors 300, 303, and a resistor 304 form a constant current generation circuit, of which the operation will be described below. The base terminal of NPN bipolar transistor 303 is supplied with a base current according to a reference voltage VREF (e.g., a band gap voltage). This reference voltage VREF is generated when the motor drive apparatus 500 is powered on.

In the constant current generation circuit, the collector terminals of PNP bipolar transistor 302 and of NPN bipolar transistor 303 whose emitter is grounded via resistor 304 are connected; the base terminals of PNP bipolar transistors 302, 301 are connected together; and PNP bipolar transistor 302 has its collector and base terminals connected to form a diode. Thus, when NPN bipolar transistor 303 is conductive, the base terminals of PNP bipolar transistors 302, 301 are supplied with a constant current equal to (reference voltage VREF−base-to-emitter voltage Vbe of NPN bipolar transistor 303)÷resistance 304 and are rendered conductive.

Further, in the constant current generation circuit, the collector terminals of PNP bipolar transistor 301 and of NPN bipolar transistor 300 whose emitter is grounded are connected, and NPN bipolar transistor 300 has its collector and base terminals connected to form a diode. Thus, the constant current for when PNP bipolar transistor 301 is conductive is supplied to the base terminal of NPN bipolar transistor 300, and NPN bipolar transistor 300 is rendered conductive.

Moreover, the base terminal of NPN bipolar transistor 300 is connected to the base terminal of NPN bipolar transistor 200 whose emitter is grounded. Thus, part of the constant current supplied toward the base terminal of NPN bipolar transistor 300 is supplied to the base terminal of NPN bipolar transistor 200, and NPN bipolar transistor 200 is rendered conductive.

In this way, when the reference voltage VREF is supplied to the base terminal of NPN bipolar transistor 303, the constant current generation circuit generates and supplies a constant base current to the base terminal of NPN bipolar transistor 200. This constant current generation circuit, PNP bipolar transistors 201, 202, 203 and NPN bipolar transistor 200, 204, 205, 206 form charge/discharge circuit 122 charging and discharging capacitor 132.

PNP bipolar transistors 201, 202, 203 have their emitter terminals supplied with the upper limiter voltage Vsh and their base terminals connected together. The collector terminals of PNP bipolar transistor 201 and of NPN bipolar transistor 200 whose emitter is grounded are connected, and PNP bipolar transistor 201 has its collector and base terminals connected to form a diode.

The collector terminal of PNP bipolar transistor 202 is connected to the collector terminal of NPN bipolar transistor 204 whose emitter is grounded and to the collector and base terminals of NPN bipolar transistor 206. The output H30 of comparator 23 is supplied to the base terminal of NPN bipolar transistor 204 whose emitter is grounded.

Furthermore, the collector terminal of PNP bipolar transistor 203 is connected to the collector terminal of NPN bipolar transistor 205, the other terminal of capacitor 132 whose one terminal is grounded, and the minus input terminal of comparator 152. The base terminal of NPN bipolar transistor 205 is connected to the base terminal of NPN bipolar transistor 206 and the collector terminal of NPN bipolar transistor 204.

Here, as shown in FIG. 6(a), while the motor is driven to rotate, the sine-wave-shaped position detection signal from hall device 12 is inputted to comparator 23 via input terminal IN3±. Consider that at an electric angle of 0°, the pulse-like position detection signal generated by comparator 23 switches from one voltage level (Low level) to the other voltage level (High level). Note that series resistor 103, operational amplifier 110, limiter circuit 111, and series resistor 140 supply the comparison reference voltage Vr to the plus input terminal of comparator 152.

At this time, since the motor is driven to rotate, the motor drive apparatus 500 is already powered on and the reference voltage VREF is supplied to the base terminal of NPN bipolar transistor 303. Hence, the constant current generated in the constant current generation circuit is supplied to the base terminal of NPN bipolar transistor 200, thereby rendering NPN bipolar transistor 200 conductive.

Moreover, since the collector and base terminals of PNP bipolar transistor 201 are connected to form a diode, NPN bipolar transistor 200 being conductive causes PNP bipolar transistor 201 to be also conductive. Furthermore, since the base terminals of PNP bipolar transistors 202, 203 are connected together to the base terminal of PNP bipolar transistor 201, PNP bipolar transistors 202, 203 also become conductive. Thus, PNP bipolar transistors 201, 202, 203 each have a collector current I flowing through it.

The output H30 of comparator 23, which has switched from one voltage level (Low level) to the other voltage level (High level), is supplied to the base terminal of NPN bipolar transistor 204, thereby rendering NPN bipolar transistor 204 conductive. As a result, the base potential of NPN bipolar transistors 205, 206 is pulled to ground potential via NPN bipolar transistor 204, thereby rendering NPN bipolar transistors 205, 206 non-conductive. The collector current I of PNP bipolar transistor 203 flows into capacitor 132, thereby charging capacitor 132.

Here, as shown in FIG. 6(d), the charge/discharge voltage TC3 at the terminal of capacitor 132 rises from the variable voltage V1 to the upper limiter voltage Vsh with a slope depending on the capacitance C of capacitor 132. During this rise, comparator 152 compares the comparison reference voltage Vr produced at the connection of resistors 141, 142 of series resistor 140 and the charge/discharge voltage TC3.

As shown in FIG. 6(e), comparator 152 outputs the timing delayed signal TC3', which is at the one voltage level (Low level) when the charge/discharge voltage TC3 on the rise from the variable voltage V1 to the upper limiter voltage Vsh is below the comparison reference voltage Vr and at the other voltage level (High level) when at or above the comparison reference voltage Vr.

The charge/discharge voltage TC3 is held at the voltage level of the upper limiter voltage Vsh due to the restriction by the upper limiter voltage Vsh after reaching that voltage level. Consider that the output H30 of comparator 23 switches from the other voltage level (High level) to the one voltage level (Low level) at an electric angle of 90° as shown in FIG. 6(a).

At this time, the output H30 of comparator 23, which has switched from the other voltage level (High level) to the one voltage level (Low level), is supplied to the base terminal of NPN bipolar transistor 204, thereby rendering NPN bipolar transistor 204 non-conductive. Here, PNP bipolar transistors 202, 203 remain conductive and hence, the upper limiter voltage Vsh is supplied to the base terminals of NPN bipolar transistors 205, 206, thereby rendering NPN bipolar transistors 205, 206 conductive.

Here, it is assumed that a current 2I (=collector current I×2) flows into the collector terminal of NPN bipolar transistor 205, and thus a current I from charged capacitor 132 as well as the collector current I of PNP bipolar transistors 203 flow into the collector terminal of NPN bipolar transistor 205.

Capacitor 132 is discharged in this way, and thus, as shown in FIG. 6(d), the charge/discharge voltage TC3 at the terminal of capacitor 132 falls from the upper limiter voltage Vsh to the variable voltage V1 with a slope depending on the capacitance C of capacitor 132. During this fall, comparator 152 compares the comparison reference voltage Vr and the charge/discharge voltage TC3.

As shown in FIG. 6(e), comparator 152 outputs the timing delayed signal TC3', which is at the other voltage level (High level) when the charge/discharge voltage TC3 on the fall from the upper limiter voltage Vsh to the variable voltage V1 is above the comparison reference voltage Vr and at the one voltage level (Low level) when at or below the comparison reference voltage Vr.

As described above, comparator 152 outputs the timing delayed signal TC3' delayed by the timing delay time TC, which the charge/discharge voltage TC3 takes to reach the comparison reference voltage Vr, with respect to the edge timings, at which the levels are switched, of the output H30 of comparator 23.

Then, the three-phase logic circuit 30 renders NMOS-FETs 51, 52, 53, 54, 55, 56 conductive in timings based on the timing delayed signal TC3' (see FIG. 6(e)) and the timing delayed signals TC1' (see FIG. 6(g)) and TC2' (see FIG. 6(f)) generated likewise for the other two phases, the timings being delayed, by the timing delay time TC, with respect to the edge timings of the outputs of comparators 21, 22, 23 having inputted thereto position detection signals detected by hall devices 10, 11, 12. Note that the timing delay time TC is set to be proportional to the potential difference (Vsh−V1) between the upper limiter voltage Vsh output from operational amplifier 110 and the variable voltage V1 output from limiter circuit 111, that is, the rotation speed setting voltage VIND0 (V).

Figure 7:
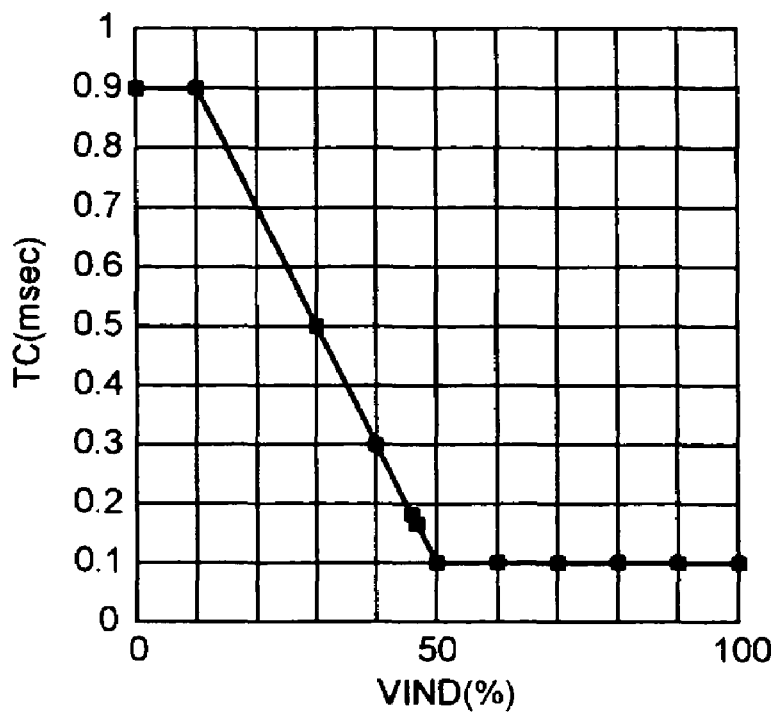
FIG. 7 is a view for explaining a relationship between the rotation speed setting voltage ratio VIND (%) and timing delay time TC according to the embodiment of the present invention.
Figure 8:
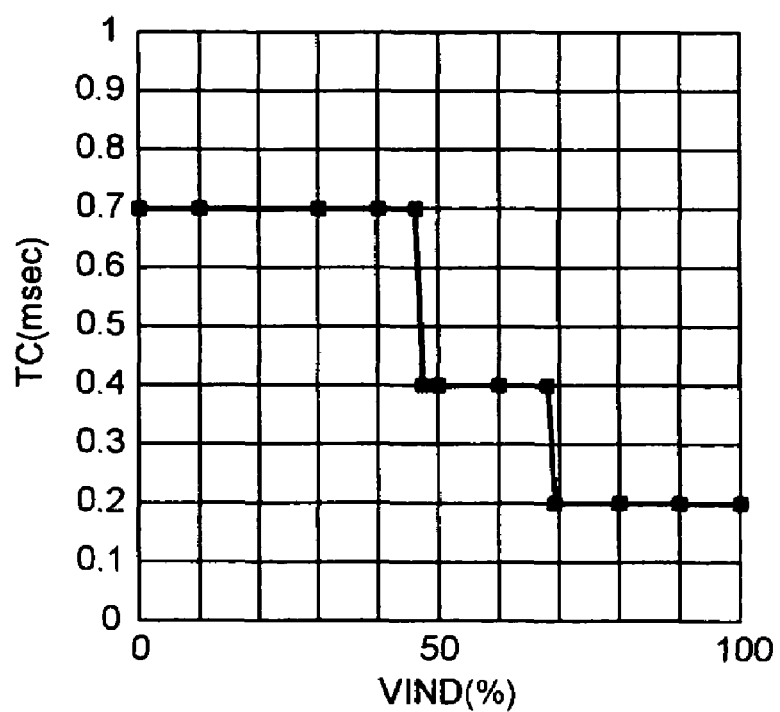
FIG. 8 is a view for explaining a relationship between the rotation speed setting voltage ratio VIND (%) and the timing delay time TC according to the conventional art.

FIG. 7 shows an example of the setting of the timing delay time TC according to the present invention. As opposed to the conventional art shown in FIG. 8, the timing delay time TC is set to be proportional to the rotation speed setting voltage ratio VIND (%) for the section where the rotation speed setting voltage ratio VIND (%) is from 10 to 50%.

In the example shown in FIG. 7, the timing delay time TC is fixed at the upper limit (e.g., 0.9 ms) for the section where the rotation speed setting voltage ratio VIND (%) is from 0 to 10% and at the lower limit (e.g., 0.1 ms) for the section of 50 to 100%, but needless to say, the timing delay time TC may be set to be proportional to the rotation speed setting voltage ratio VIND (%) for the whole section of 0 to 100%.

According to the present invention, the possibility that the setting of the timing delay time TC may become unstable or change sharply depending on the rotation speed setting voltage ratio VIND (%) specified by an external device such as a microcomputer is eliminated. Also, as a result, noise associated with the variation in the rotation speed of the motor can be reduced.

Although the preferred embodiment of the present invention has been described in detail, the above embodiment is provided to facilitate the understanding of the present invention and not intended to limit the present invention. It should be understood that various changes, substitutions and alterations can be made therein without departing from spirit and scope of the invention and that the present invention includes its equivalents.

===Limiter Circuit===

In the above embodiment, the timing delay time TC according to the present invention can be set without limiter circuit 111. However, noise may be contained in the rotation speed setting voltage ratio VIND (%) specified by an external device such as a microcomputer, and by providing limiter circuit 111, spike-shaped noise whose voltage level rises sharply can be removed from the variable voltage V1. As a result, the stable variable voltage V1 is supplied to charge/discharge circuits 120, 121, 122, and thus, the timing delay time TC stable with no variation can be set.

Furthermore, while limiter circuit 111 is configured to limit the rotation speed setting voltage VIND0 (V) so as to become voltage VTCL or lower, conversely, limiter circuit 111 may be configured to limit the rotation speed setting voltage VIND0 (V) so as to become voltage VTCL or higher. However, in this case, since the range of the upper limiter voltage Vsh to the variable voltage V1 becomes narrower, it is difficult to set the timing delay time TC to be long, compared with the case of limiting the rotation speed setting voltage VIND0 (V) so as to become voltage VTCL or lower. Moreover, the rotation speed setting voltage VIND0 (V) may exceed the upper limiter voltage Vsh due to spike-shaped noise mentioned above, and hence, a stable variable voltage V1 may not be supplied to charge/discharge circuits 120, 121, 122. Accordingly, in order to facilitate the setting of the timing delay time TC, limiter circuit 111 is preferably configured to limit the rotation speed setting voltage VIND0 (V) so as to become voltage VTCL or lower.

Furthermore, limiter circuit 111 may be provided to the voltage VTCH side of series resistor 103. In this case, the limiter circuit has the voltage VTCH of series resistor 103 and the rotation speed setting voltage VIND0 (V) inputted thereto, and the limiter circuit is configured to limit the rotation speed setting voltage VIND0 (V) so as to become voltage VTCH or higher, in order to facilitate the setting of the timing delay time TC. Note that the voltage VTCL of series resistor 103 is not inputted to limiter circuit 111, but provides a fixed voltage (lower limiter voltage) to the lower-voltage side terminal of each capacitor 130, 131, 132 in charge/discharge. With this configuration, the same effect as with the above embodiment can be obtained.

===Characteristic of Resistors===

In the previously described embodiment, resistors 100, 101, 102 forming series resistor 103 preferably have the same characteristic (e.g., against temperature, i.e., a temperature coefficient) so that voltage VTCH from which the upper limiter voltage Vsh is produced and voltage VTCL from which the variable voltage V1 is produced do not vary with the variation of ambient conditions. Thereby, the variation of voltage VTCH and voltage VTCL with the variation of ambient conditions can be suppressed, and the stable timing delay time TC can be set.

Also, for the same reason, resistors 141, 142 forming series resistor 140 preferably have the same characteristic. Further, if all resistors 100, 101, 102, 141, 142 are made the same in the characteristic, the further stable timing delay time TC can be set.

===Comparators===

In the previously described embodiment, comparator 150, 151, 152 outputs the timing delayed signal TC1', TC2', TC3' delayed by the timing delay time TC, which the charge/discharge voltage TC1, TC2, TC3 takes to reach the comparison reference voltage Vr, with respect to the edge timings of the output H10, H20, H30 of comparator 21, 22, 23. However, not being limited to the time that the charge/discharge voltage TC1, TC2, TC3 takes to reach the comparison reference voltage Vr, the delay time of the edge timings of the timing delayed signal TC1', TC2', TC3' may be the time that the charge/discharge voltage takes to reach a predetermined voltage below or above the comparison reference voltage Vr. In this case, a level shift circuit (not shown) for shifting the comparison reference voltage Vr to the predetermined voltage in voltage level need be provided between the connection of resistors 141, 142 of series resistor 140 and the plus input terminals of comparators 150, 151, 152.

===Timing Delay Time TC===

In the previously described embodiment, the timing delay time TC is set to be proportional to the rotation speed setting voltage VIND0 (V) and thus the rotation speed setting voltage ratio VIND (%). However, not being limited to this, in, e.g., FIG. 7, the rotation speed setting voltage ratio VIND (%) and the timing delay time TC may be in a relationship where one is a predetermined curve-defining function of the other (a quadratic, a cubic, an exponential, an elliptic, or other function). This can be realized by a logic circuit that adjusts the voltage level of the comparison reference voltage Vr based on, for example, the slope of the tangent line of the curve corresponding to the rotation speed setting voltage ratio VIND (%).

Note that where the relationship between the rotation speed setting voltage ratio VIND (%) and the timing delay time TC is a curve function, the timing delay time TC may sharply vary with the rotation speed setting voltage ratio VIND (%), and hence, the timing delay time TC is preferably set to be proportional to the rotation speed setting voltage ratio VIND (%).

It is claimed:

1. A motor drive apparatus comprising:
 a charge/discharge reference voltage generation circuit that generates two different charge/discharge reference voltages that define an upper limit and a lower limit of a potential difference which varies continuously according to a rotation speed setting voltage for setting a rotation speed of a motor;
 a capacitor that is charged and discharged;
 a charge/discharge circuit that switches charge and discharge of the capacitor so that the capacitor is charged/discharged between the two charge/discharge reference voltages according to a pulse signal which indicates a relative position between a rotor and a stator of the motor;
 a comparator that compares a charge/discharge voltage of the capacitor with a comparison reference voltage between the two charge/discharge reference voltages, and generates a pulse-delayed signal by continuously delaying the pulse signal according to the rotation speed setting voltage; and
 a drive circuit that turns on and off a drive transistor for causing a current to flow through a drive coil of the motor, based on the pulse-delayed signal.

2. The motor drive apparatus according to claim 1, wherein the pulse-delayed signal is delayed relative to the pulse signal by delay time proportional to a voltage level of the rotation speed setting voltage.

3. The motor drive apparatus according to claim 1, wherein in the charge/discharge circuit switches charge and discharge of the capacitor at edge timings of the pulse-delayed signal and the delay time of the pulse signal relative to the pulse signal is a time period from when the charge/discharge voltage of the capacity is either of the charge/discharge reference voltages until the charge/discharge voltage equals to the comparison reference voltage.

4. The motor drive apparatus according to claim 1, wherein the charge/discharge reference voltage generation circuit comprises a limiter circuit that limits one, generated based on the rotation speed setting voltage, of the two charge/discharge reference voltages so as to be at or below a predetermined upper limit voltage, or to be at or above a predetermined lower limit voltage.

5. The motor drive apparatus according to claim 4, wherein the charge/discharge reference voltage generation circuit comprises a series resistor having a first voltage supplied to one terminal thereof and a second voltage lower than the first voltage supplied to the other terminal thereof,
 wherein the voltage of a first connection of the series resistor is a higher one of the two charge/discharge reference voltages,
 wherein the voltage of a second connection of the series resistor is a limit for a lower one of the two charge/discharge reference voltages, the second connection being at the second voltage side, and
 wherein the rotation speed setting voltage limited to be at or below the limit by the limiter circuit is the lower one of the two charge/discharge reference voltages.

6. The motor drive apparatus according to claim 4, wherein the charge/discharge reference voltage generation circuit comprises a series resistor having a first voltage supplied to one terminal thereof and a second voltage lower than the first voltage supplied to the other terminal thereof,
 wherein the voltage of a first connection of the series resistor is a limit for a higher one of the two charge/discharge reference voltages,
 wherein the voltage of a second connection of the series resistor is a lower one of the two charge/discharge reference voltages, the second connection being at the second voltage side, and
 wherein the rotation speed setting voltage limited to be at or above the limit by the limiter circuit is the higher one of the two charge/discharge reference voltages.

7. The motor drive apparatus according to claim 5, wherein the series resistor is made up of resistors having the same characteristic.

8. The motor drive apparatus according to claim 6, wherein the series resistor is made up of resistors having the same characteristic.

9. The motor drive apparatus according to claim 1, further comprising a series resistor to which the two charge/discharge reference voltages are applied on both ends thereof wherein the comparison reference voltage is a voltage at a predetermined connection of the series resistor.

10. The motor drive apparatus according to claim 9, wherein the series resistor is made up of resistors having the same characteristic.

11. The motor drive apparatus according to claim 1, wherein when the motor is a three-phase motor, the control circuit has the capacitor, the charge/discharge circuit, and the comparator which are provided for each phase, and the charge/discharge reference voltage generation circuit is shared between the phases.

12. The motor drive apparatus according to claim 1, which is configured as an integrated circuit.

13. A motor drive method comprising:
 generating two different charge/discharge reference voltages that define an upper limit and a lower limit of a potential difference which varies continuously according to a rotation speed setting voltage for setting a rotation speed of a motor;

switching charge and discharge of a capacitor so that the capacitor is charged/discharged between the two charge/discharge reference voltages according to a pulse signal which indicates a relative position between a rotor and a stator of the motor;

comparing a charge/discharge voltage of the capacitor with a comparison reference voltage between the two charge/discharge reference voltages, and generating a pulse-delayed signal by continuously delaying the pulse signal according to the rotation speed setting voltage;

turning on and off a drive transistor for causing a current to flow through a drive coil of the motor, based on the pulse-delayed signal.

14. A motor drive apparatus comprising:
a reference voltage generation circuit adapted to generate two different reference voltages that define an upper limit and a lower limit of a potential difference which is based on a rotation speed setting voltage for setting a rotation speed of a motor;
a capacitor adapted to be charged and discharged;
a charge/discharge circuit adapted to perform a switching function causing the capacitor to either charge or discharge based on a voltage between the two reference voltages according to a pulse signal which indicates a relative position between a rotor and a stator of the motor;
a comparator adapted to compare a voltage of the capacitor with a comparison reference voltage between the two reference voltages, and generate a pulse-delayed signal by continuously delaying the pulse signal according to the rotation speed setting voltage, wherein the rotation speed setting voltage is gradually changed; and
a drive circuit adapted to turns on and off a drive transistor for causing a current to flow through a drive coil of the motor, based on the pulse-delayed signal.

15. The motor drive apparatus according to claim 14, wherein the pulse-delayed signal is delayed relative to the pulse signal by delay time proportional to a voltage level of the rotation speed setting voltage.

16. The motor drive apparatus according to claim 14, wherein in the charge/discharge circuit is further adapted to perform the switching function at edge timings of the pulse-delayed signal, and the delay time of the pulse signal relative to the pulse signal is a time period from when the voltage of the capacitor is either of, the reference voltages until the charge/discharge voltage equals to the comparison reference voltage.

17. The motor drive apparatus according to claim 14 wherein the reference voltage generation circuit comprises a limiter circuit that limits one, generated based on the rotation speed setting voltage, of the two reference voltages so as to be at or below a predetermined upper limit voltage, or to be at or above a predetermined lower limit voltage.

18. The motor drive apparatus according to claim 14, wherein the reference voltage generation circuit comprises a series resistor having a first voltage supplied to one terminal thereof and a second voltage lower than the first voltage supplied to the other terminal thereof,
wherein the voltage of a first connection of the series resistor is a higher one of the two reference voltages,
wherein the voltage of a second connection of the series resistor is a limit for a lower one of the two reference voltages, the second connection being at the second voltage side, and
wherein the rotation speed setting voltage limited to be at or below the limit by the limiter circuit is the lower one of the two reference voltages.

19. The motor drive apparatus according to claim 14, wherein the reference voltage generation circuit comprises a series resistor having a first voltage supplied to one terminal thereof and a second voltage lower than the first voltage supplied to the other terminal thereof,
wherein the voltage of a first connection of the series resistor is a limit for a higher one of the two reference voltages,
wherein the voltage of a second connection of the series resistor is a lower one of the two reference voltages, the second connection being at the second voltage side, and
wherein the rotation speed setting voltage limited to be at or above the limit by the limiter circuit is the higher one of the two reference voltages.

20. The motor drive apparatus according to claim 19, wherein the series resistor is made up of resistors having the same characteristic.

* * * * *

UNITED STATES PATENT AND TRADEMARK OFFICE
CERTIFICATE OF CORRECTION

PATENT NO. : 7,053,573 B2
APPLICATION NO. : 11/046412
DATED : May 30, 2006
INVENTOR(S) : Okumura et al.

Page 1 of 1

It is certified that error appears in the above-identified patent and that said Letters Patent is hereby corrected as shown below:

Column 12 line 1, replace "capacity" with "capacitor".

Signed and Sealed this

Fifteenth Day of August, 2006

JON W. DUDAS
*Director of the United States Patent and Trademark Office*